(12) United States Patent
Fujiwara et al.

(10) Patent No.: US 12,368,508 B2
(45) Date of Patent: Jul. 22, 2025

(54) OPTICAL ACCESS SYSTEM, OPTICAL TRANSMITTER, OPTICAL RECEIVER, OPTICAL TRANSMISSION METHOD AND DEMODULATION METHOD

(71) Applicant: NIPPON TELEGRAPH AND TELEPHONE CORPORATION, Tokyo (JP)

(72) Inventors: Masamichi Fujiwara, Musashino (JP); Ryo Igarashi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 144 days.

(21) Appl. No.: 18/018,946

(22) PCT Filed: Aug. 5, 2020

(86) PCT No.: PCT/JP2020/029926
§ 371 (c)(1),
(2) Date: Jan. 31, 2023

(87) PCT Pub. No.: WO2022/029910
PCT Pub. Date: Feb. 10, 2022

(65) Prior Publication Data
US 2023/0299848 A1 Sep. 21, 2023

(51) Int. Cl.
*H04B 10/077* (2013.01)
(52) U.S. Cl.
CPC .................. *H04B 10/077* (2013.01)
(58) Field of Classification Search
CPC ................................................ H04B 10/077
(Continued)

(56) References Cited

U.S. PATENT DOCUMENTS

| 2012/0121257 A1* | 5/2012 | Tanaka | H04J 14/02216 398/34 |
| 2014/0078506 A1* | 3/2014 | Hu | G01M 11/3118 356/445 |

(Continued)

FOREIGN PATENT DOCUMENTS

| JP | 2003143079 A | * | 5/2003 | |
| JP | 2019097108 A | * | 6/2019 | ............. H04B 10/27 |

(Continued)

OTHER PUBLICATIONS

Honda et al; WDM-PON Management and Control by Auxiliary Management and Control Channel for 5G Mobile Fronthaul Dec. 2021; Optics Express; pp. 1-14. (Year: 2021).*

(Continued)

*Primary Examiner* — Amritbir K Sandhu
(74) *Attorney, Agent, or Firm* — Harness, Dickey & Pierce, P.L.C.

(57) ABSTRACT

An optical access system includes an optical transmission device and an optical reception device. In the optical access system, the optical transmission device includes: a signal generation unit that generates a plurality of optical signals by generating monitoring control signals including identical information in predetermined cycles and superimposing the monitoring control signal on a main signal each time generating the monitoring control signal; and a transmission unit that transmits the generated optical signals to the optical reception device. The optical reception device includes: a photoelectric conversion unit that converts the optical signals into electrical signals; an analog-to-digital converter that generates quantized data of a plurality of monitoring control signals by sampling a plurality of electrical signals including the plurality of monitoring control signals; an averaging processing unit that performs an averaging process on a plurality of pieces of the generated quantized data;

(Continued)

and a demodulation unit that demodulates the monitoring control signals, using the plurality of pieces of the quantized data subjected to the averaging process.

5 Claims, 9 Drawing Sheets

(58) Field of Classification Search
USPC .............................................................. 398/9
See application file for complete search history.

(56) References Cited

U.S. PATENT DOCUMENTS

| | | | |
|---|---|---|---|
| 2020/0136722 A1* | 4/2020 | Urban ................. | H04B 10/0779 |
| 2021/0273777 A1 | 9/2021 | Yoshida et al. | |
| 2021/0314063 A1* | 10/2021 | Huang ................. | H04B 10/294 |
| 2023/0299848 A1* | 9/2023 | Fujiwara .............. | H04B 10/077 |
| | | | 398/9 |
| 2024/0031035 A1* | 1/2024 | Igarashi .............. | H04J 14/0273 |
| 2024/0187092 A1* | 6/2024 | Senoo ................. | H04J 14/0276 |

FOREIGN PATENT DOCUMENTS

| | | | | |
|---|---|---|---|---|
| JP | 2019-213218 A | | 12/2019 | |
| WO | WO-2023159046 A1 | * | 8/2023 | ......... G01D 5/35361 |

OTHER PUBLICATIONS

Shen et al; (Demonstration of Auxiliary Management and Control Channel Transmission and Data-Channel Signal Compensation for Beyond 100G FDM Coherent PON; 2024; pp. 1-3. (Year: 2024).*
Kyosuke Sone et al., "Demonstration of Simultaneous Multiple ONUs Activation in WDM-PON System for 5G Mobile Fronthaul", IEICE Technical Report, CS2018-94, 2019.
Goji Nakagawa et al., "Proposal and Characteristics Evaluation of Compact and Low Cost AMCC Superimposition with Magneto-Optic VOA", IEICE Technical Report, CS2018-7, 2018.
Satoshi Yoshima et al., "Experimental Investigation of an Optically-superimposed AMCC in 100 Gb/s Coherent WDM-PON for 5G Mobile Fronthaul", ECOC2016, Th.1.D.1, 2016.
Kyosuke Sone et al., "Demonstration of Remote Management and Control in WDM-PON System for 5G Mobile Fronthaul", IEICE Technical Report, 2020.
International Search Report of the ISA (English and Japanese) issued in PCT/JP2020/029926, mailed Dec. 22, 2020; ISA/JP.

* cited by examiner

OPTICAL ACCESS SYSTEM, OPTICAL TRANSMITTER, OPTICAL RECEIVER, OPTICAL TRANSMISSION METHOD AND DEMODULATION METHOD

CROSS-REFERENCE TO RELATED APPLICATIONS

This application is a 371 U.S. National Phase of International Application No. PCT/JP2020/029926, filed on Aug. 5, 2020. The entire disclosure of the above application is incorporated herein by reference.

TECHNICAL FIELD

The present invention relates to an optical access system, an optical transmission device, an optical reception device, an optical transmission method, and a demodulation method.

BACKGROUND ART

As an optical access system, an optical access system using a wavelength division multiplexing (WDM) technology has been suggested (see Non Patent Literatures 1 to 3, for example).

Figure 8:
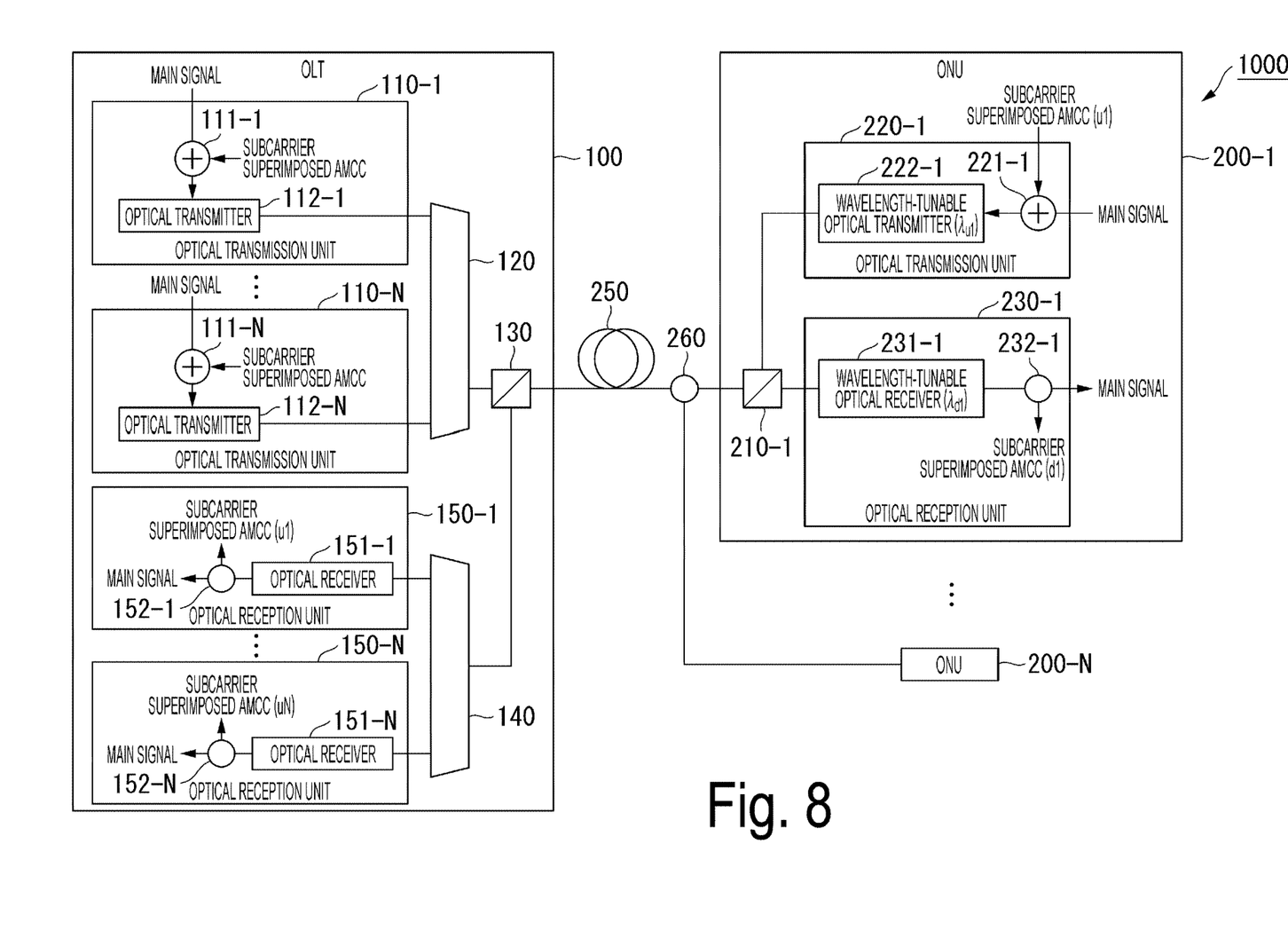
FIG. 8 is a diagram illustrating a (first) example configuration of a conventional optical access system.

FIG. 8 is a diagram illustrating a (first) example configuration of a conventional optical access system 1000. In the optical access system 1000, WDM signals generated by superimposing monitoring control signals specified by the auxiliary management and control channels (AMCCs) for the respective wavelengths are transmitted and received in the uplink direction and the downlink direction.

The optical access system 1000 includes an optical line terminal (OLT) 100 and a plurality of optical network units (ONUs) 200-1 to 200-N (N being an integer of 2 or greater). The OLT 100 and the ONUs 200-1 to 200-N are communicably connected via an optical fiber 250 and an optical splitter 260. The OLT 100 includes N optical transmission units 110-1 to 110-N, a wavelength multiplexer 120, a WDM filter 130, a wavelength demultiplexer 140, and N optical reception units 150-1 to 150-N. The system configuration of the optical access system 1000 is an example configuration of a TWDM-PON (Time Wavelength Division Multiplexing-Passive Optical Network) system specified by ITU-T G.989.2 series, for example.

The optical transmission units 110-1 to 110-N generate optical signals having different wavelengths from one another. Each wavelength is subjected to amplitude modulation with an electrical signal generated by adding a weak monitoring control signal to a main signal (a binary on/off signal). The optical transmission units 110-1 to 110-N include addition units 111-1 to 111-N and optical transmitters 112-1 to 112-N, respectively. The addition units 111-1 to 111-N add input main signals to monitoring control signals superimposed on subcarriers. Here, the monitoring control signals superimposed on subcarriers are used to cope with AC coupling optical receivers.

The optical transmitters 112-1 to 112-N generate optical signals having different wavelengths by performing amplitude modulation on the electrical signals obtained through the additions performed by the addition units 111-1 to 111-N. The optical signals generated in this manner are obtained by superimposing the monitoring control signals on main signals. The optical signals generated by the optical transmitters 112-1 to 112-N are multiplexed by the wavelength multiplexer 120, to turn into a downlink WDM signal. The downlink WDM signal is transmitted to the ONUs 200-1 to 200-N via the WDM filter 130, the optical fiber 250, and the optical splitter 260.

The WDM filter 130 multiplexes light beams having different wavelengths or demultiplexes an input optical signal. An optical signal demultiplexed by the WDM filter 130 is input to the wavelength demultiplexer 140.

The wavelength demultiplexer 140 divides the input optical signal into light beams of the respective wavelengths, and outputs the light beams. The wavelength demultiplexer 140 has a plurality of ports for outputting light beams of different wavelengths, and the optical reception units 150-1 to 150-N are connected to the respective ports.

The optical reception units 150-1 to 150-N extract the main signals and the monitoring control signals superimposed on the subcarriers from optical signals input to the OLT 100. The optical reception units 150-1 to 150-N include optical receivers 151-1 to 151-N and optical branching units 152-1 to 152-N, respectively. The optical receivers 151-1 to 151-N optically detect the input optical signals, and convert the optical signals into electrical signals. The optical branching units 152-1 to 152-N branch the electrical signals. Further, at each processing unit in a subsequent stage, the main signal is acquired from one branched signal, and the monitoring control signal superimposed on the subcarrier is acquired from the other branched signal.

The ONUs 200-1 to 200-N include WDM filters 210-1 to 210-N, optical transmission units 220-1 to 220-N, and optical reception units 230-1 to 230-N. Note that the ONUs 200-1 to 200-N have the same configurations, and therefore, the specific configuration of the ONU 200-1 is described as an example herein. The WDM filter 210-1 multiplexes light beams having different wavelengths or demultiplexes an input optical signal. An optical signal demultiplexed by the WDM filter 210-1 is input to the optical reception unit 230-1.

The optical transmission unit 220-1 generates an optical signal having a wavelength that is set in the ONU 200-1. The optical transmission unit 220-1 includes an addition unit 221-1 and a wavelength-tunable optical transmitter 222-1. The addition unit 221-1 adds a main signal input to the ONU 200-1, to a monitoring control signal superimposed on a subcarrier.

The wavelength-tunable optical transmitter 222-1 generates an optical signal having the wavelength set in the ONU 200-1, by performing amplitude modulation on the electrical signal obtained through the addition performed by the addition unit 221-1. The respective optical signals generated by the ONUs 200-1 to 200-N are multiplexed by the optical splitter 260, to turn into an uplink WDM signal. The uplink WDM signal is transmitted to the OLT 100 via the optical splitter 260 and the optical fiber 250.

The optical reception unit 230-1 extracts the main signal and the monitoring control signal superimposed on the subcarrier from an input optical signal. The optical reception unit 230-1 includes a wavelength-tunable optical receiver 231-1 and a branching unit 232-1. A tunable optical filter is mounted on the wavelength-tunable optical receiver 231-1, and the transmission wavelength thereof is swept when the ONU 200-1 is connected to the system. When detecting a downlink wavelength, the ONU 200-1 reads unused wavelength information that is buried in the monitoring control signal and concerns the pair in the uplink direction and the downlink direction, and sets the transmission wavelength of the tunable optical filter and the output wavelength of the wavelength-tunable optical transmitter 222-1 as unused wavelengths (see Non Patent Literature 1, for example).

Note that, although FIG. 8 illustrates an example in which the ONU 200-1 selects the pair of wavelengths $\lambda_{d1}$ and $\lambda_{u1}$, the ONU 200-1 may select any wavelength pair, from $\lambda_{d1}$ and $\lambda_{u1}$ to $\lambda_{dN}$ and $\lambda_{uN}$, as long as there are unused wavelengths.

The wavelength-tunable optical receiver 231-1 converts an optical signal having the set wavelength into an electrical signal. The branching unit 232-1 branches the electrical signal. Further, at each processing unit in a subsequent stage, the main signal is acquired from one branched signal, and the monitoring control signal superimposed on the subcarrier is acquired from the other branched signal. The monitoring control signal is also superimposed on an uplink optical signal, and Ack is returned to the OLT 100.

Figure 9:
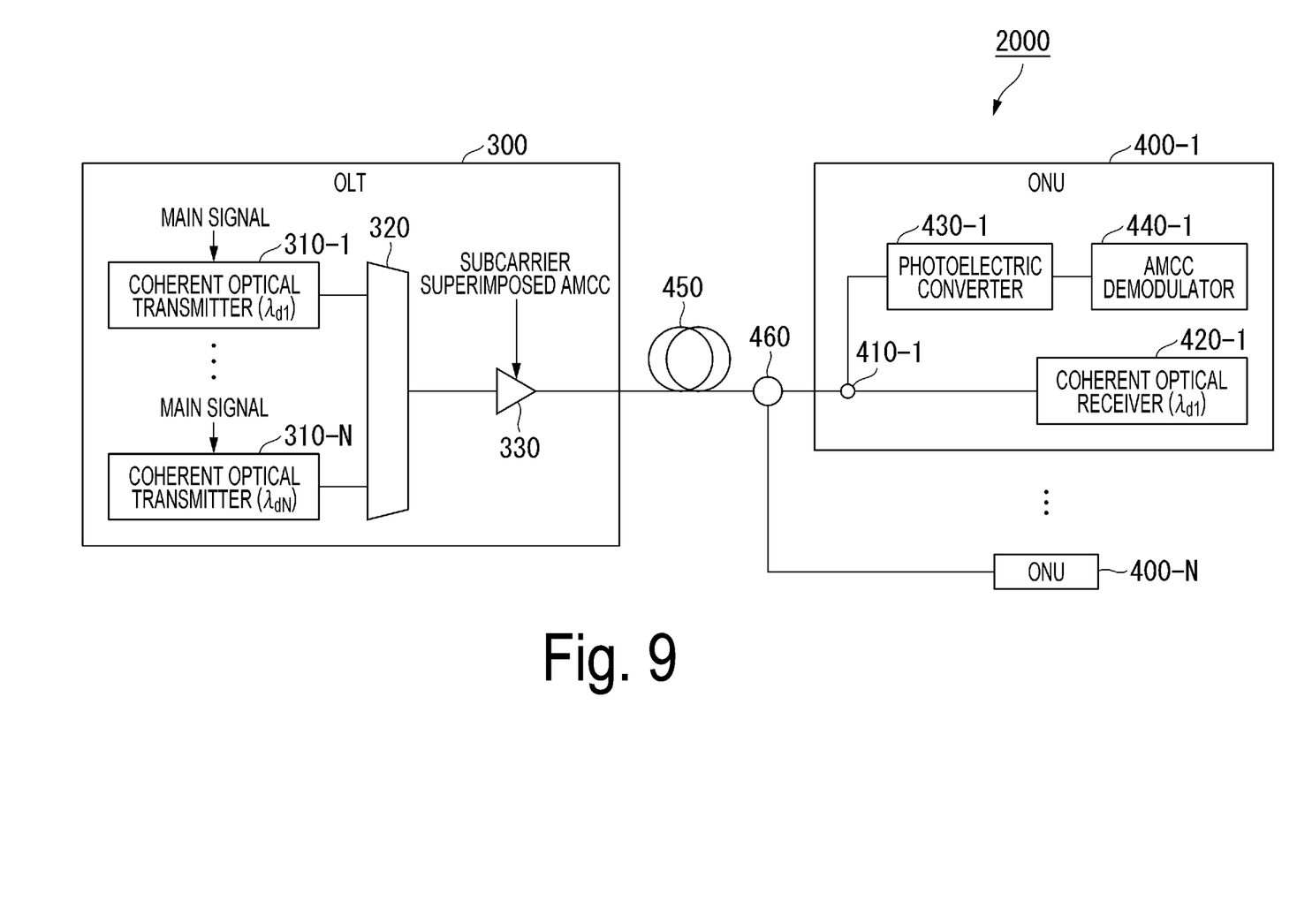
FIG. 9 is a diagram illustrating a (second) example configuration of a conventional optical access system.

FIG. 9 is a diagram illustrating a (second) example configuration of a conventional optical access system 2000. In the optical access system 1000, monitoring control signals are collectively superimposed on a downlink WDM signal. The optical access system 2000 includes an OLT 300 and a plurality of ONUs 400-1 to 400-N. The OLT 300 and the ONUs 400-1 to 400-N are communicably connected via an optical fiber 450 and an optical splitter 460.

The OLT 100 includes N coherent optical transmitters 310-1 to 310-N, a wavelength multiplexer 320, and a semiconductor optical amplifier 330. The N coherent optical transmitters 310-1 to 310-N, the wavelength multiplexer 320, and the semiconductor optical amplifier 330 function as a multiple-wavelength transmitter.

The N coherent optical transmitters 310-1 to 310-N generate optical signals having different wavelengths on which main signals are superimposed. These optical signals are multiplexed by the wavelength multiplexer 320, so that a downlink WDM signal is generated. The semiconductor optical amplifier 330 is used to amplify the intensity of the WDM signal entering the transmission path, and modulates the drive current with weak monitoring control signals, to collectively superimpose the monitoring control signals on the intensity of the WDM signal. Note that a baseband monitoring control signal may be subjected to subcarrier modulation, or may remain a baseband signal as disclosed in Non Patent Literature 3.

The ONUs 400-1 to 400-N include optical branching units 410-1 to 410-N, coherent optical receivers 420-1 to 420-N, photoelectric converters 430-1 to 430-N, and AMCC demodulators 440-1 to 440-N. Note that the ONUs 400-1 to 400-N have the same configurations, and therefore, the specific configuration of the ONU 400-1 is described as an example herein.

The optical branching unit 410-1 branches a downlink WDM signal input to the ONU 400-1. A portion of the downlink WDM signal branched by the optical branching unit 410-1 is input to the coherent optical receiver 420-1. The coherent optical receiver 420-1 coherently receives a desired optical signal, matching the wavelength of the local light with the wavelength of the WDM signal to be received. Intradyne detection or heterodyne detection can be used as the coherent detection method.

The other portion of the downlink WDM signal branched by the optical branching unit 410-1 is input to the photoelectric converter 430-1. The photoelectric converter 430-1 converts the input downlink WDM signal into an electrical signal. The AMCC demodulator 440-1 receives a monitoring control signal by demodulating the electrical signal. Note that, although all downlink WDM signals are input to the photoelectric converter 430-1, monitoring control signals can be received as long as the transmission bit rate of the monitoring control signals is sufficiently lower than the transmission bit rate of main signals.

CITATION LIST

Non Patent Literature

Non Patent Literature 1: Kyosuke Sone, Goji Nakagawa, Yoshio Hirose, Takeshi Hoshida, "Demonstration of Simultaneous Multiple ONUs Activation in WDM-PON System for 5G Mobile Fronthaul", IEICE Technical Report, CS2018-7, 2018

Non Patent Literature 2: Goji Nakagawa, Kyosuke Sone, Setsuo Yoshida, Shoichiro Oda, Motoyuki Takizawa, Tomoo Takahara, Yoshio Hirose, Takeshi Hoshida, "Proposal and Characteristics Evaluation of Compact and Low Cost AMCC Superimposition with Magneto-Optic VOA", IEICE Technical Report, CS2018-94, 2019

Non Patent Literature 3: Satoshi Yoshima, Takaaki Katsumata, Hiroshi Miura, Yuita Noguchi, Akiko Nagasawa, Naoki Suzuki, and Masaki Noda, "Experimental Investigation of an Optically-superimposed AMCC in 100 Gb/s Coherent WDM-PON for 5G Mobile Fronthaul", ECOC2016, Th.1.D.1, 2016.

SUMMARY OF INVENTION

Technical Problem

In the conventional optical access system 1000 illustrated in FIG. 8, the reception sensitivity to main signals and the reception sensitivity to monitoring control signals are preferably almost the same. The reception sensitivity to monitoring control signals is enhanced by an increase in the superimposition ratio of the monitoring control signals and an increase in the amplitude thereof. On the other hand, unnecessary components are greatly superimposed on the amplitude of the main signal, and therefore, the reception sensitivity to the main signal is degraded. Since the bit rate of the monitoring control signals is much lower than the bit rate of the main signal, the main signal is inferior in reception sensitivity under the same amplitude conditions. In view of this, the superimposition ratio of the monitoring control signals is set to a value lowered to a level at which the reception sensitivity to the main signal and the reception sensitivity to the monitoring control signals become substantially the same. For example, Non Patent Literature 2 discloses that the superimposition ratio of the monitoring control signals needs to be set to about 5% or higher, but there is not a little influence on the main signal. To enhance the reception sensitivity to monitoring control signals, and reduce the influence on the main signal, the superimposition ratio of the monitoring control signals is made as close as possible to 0%.

In the optical access system 2000 illustrated in FIG. 9, the superimposition ratio of the monitoring control signals is also set to a value lowered to a level at which the reception sensitivity to the main signal and the reception sensitivity to the monitoring control signals become substantially the same. Non Patent Literature 3 also discloses that, where the superimposition ratio of the monitoring control signals is set to about 5% or higher, the reception sensitivity to the main signal and the reception sensitivity to the monitoring control signals can be made substantially the same. However, unlike the system configuration illustrated in FIG. 8, the optical access system 2000 branches part of a downlink WDM signal that has reached the ONU 400 to receive the monitoring control signals. Therefore, the reception sensitivity to the main signal is degraded by the amount equivalent to the branched light intensity. Where the reception sensitivity to the main signal and the reception sensitivity to the monitoring control signals are almost the same, a branching unit with a branching ratio of 1:1 must be used. In this case, the reception sensitivity to the main signal is degraded by 3 dB. For example, even if a branching unit with a branching ratio of 8:2 is used, and the input light intensity ratio between the main signal and the monitoring control signals to be input to the ONU 400 is 8:2, the degradation of the reception sensitivity to the main signal can be reduced to 1 dB, as long as both kinds of signals can be received in an error-free manner. However, to achieve this, it is necessary to significantly increase the reception sensitivity to the monitoring control signals.

As described above, by the conventional technology, it is not possible to enhance the reception sensitivity to the monitoring control signals, while reducing the influence on the main signal.

In view of the above circumstances, the present invention aims to provide a technology for enhancing the reception sensitivity to the monitoring control signals, while reducing the influence on the main signal.

Solution to Problem

One mode of the present invention is an optical access system that includes an optical transmission device and an optical reception device. The optical transmission device includes: a signal generation unit that generates a plurality of optical signals by generating monitoring control signals including identical information in predetermined cycles and superimposing the monitoring control signals on a main signal each time generating the monitoring control signals; and a transmission unit that transmits the generated optical signals to the optical reception device. The optical reception device includes: a photoelectric conversion unit that converts the optical signals into electrical signals; an analog-to-digital converter that generates quantized data of a plurality of the monitoring control signals by sampling a plurality of the electrical signals including the plurality of the monitoring control signals; an averaging processing unit that performs an averaging process on a plurality of pieces of the generated quantized data; and a demodulation unit that demodulates the monitoring control signals, using the plurality of pieces of the quantized data subjected to the averaging process.

One mode of the present invention is an optical transmission device in an optical access system that includes the optical transmission device and an optical reception device. The optical transmission device includes: a signal generation unit that generates a plurality of optical signals by generating monitoring control signals including identical information in predetermined cycles and superimposing the monitoring control signals on a main signal each time generating the monitoring control signals; and a transmission unit that transmits the generated optical signals to the optical reception device.

One mode of the present invention is an optical reception device in an optical access system that includes an optical transmission device and the optical reception device. The optical reception device includes: a photoelectric conversion unit that converts an optical signal into an electrical signal, the optical signal being transmitted from the optical transmission device in a predetermined cycle, the optical signal being generated by superimposing monitoring control signals including identical information on a main signal; an analog-to-digital converter that generates quantized data of a plurality of the monitoring control signals by sampling a plurality of electrical signals including the plurality of the monitoring control signals; an averaging processing unit that performs an averaging process on a plurality of pieces of the generated quantized data; and a demodulation unit that demodulates the monitoring control signals, using the plurality of pieces of the quantized data subjected to the averaging process.

One mode of the present invention is a demodulation method implemented by an optical access system that includes an optical transmission device and an optical reception device. The optical transmission device carries out: a signal generation step of generating a plurality of optical signals by generating monitoring control signals including identical information in predetermined cycles and superimposing the monitoring control signals on a main signal each time generating the monitoring control signals; and a transmission step of transmitting the generated optical signals to the optical reception device. The optical reception device carries out: a photoelectric conversion step of converting the optical signals into electrical signals; a generation step of generating quantized data of a plurality of the monitoring control signals by sampling a plurality of the electrical signals including the plurality of the monitoring control signals; an averaging processing step of performing an averaging process on a plurality of pieces of the generated quantized data; and a demodulation step of demodulating the monitoring control signals, using the plurality of pieces of the quantized data subjected to the averaging process.

One mode of the present invention is an optical transmission method implemented by an optical transmission device in an optical access system that includes the optical transmission device and an optical reception device. The optical transmission method includes: a signal generation step of generating a plurality of optical signals by generating monitoring control signals including identical information in predetermined cycles and superimposing the monitoring control signals on a main signal each time generating the monitoring control signals; and a transmission step of transmitting the generated optical signals to the optical reception device.

One mode of the present invention is a demodulation method implemented by an optical reception device in an optical access system that includes an optical transmission device and the optical reception device. The demodulation method includes: a photoelectric conversion step of converting optical signals into electrical signals, the optical signals being transmitted from the optical transmission device in predetermined cycles, the optical signals being generated by superimposing monitoring control signals including identical information on a main signal; a generation step of generating quantized data of a plurality of the monitoring control signals by sampling a plurality of the electrical signals including the plurality of the monitoring control signals; an averaging processing step of performing an averaging process on a plurality of pieces of the generated quantized data; and a demodulation step of demodulating the monitoring control signals, using the plurality of pieces of the quantized data subjected to the averaging process.

Advantageous Effects of Invention

According to the present invention, it is possible to enhance reception sensitivity to monitoring control signals, while reducing the influence on a main signal.

DESCRIPTION OF EMBODIMENTS

The following is a description of an embodiment of the present invention, with reference to the drawings.

First Embodiment

Figure 1:
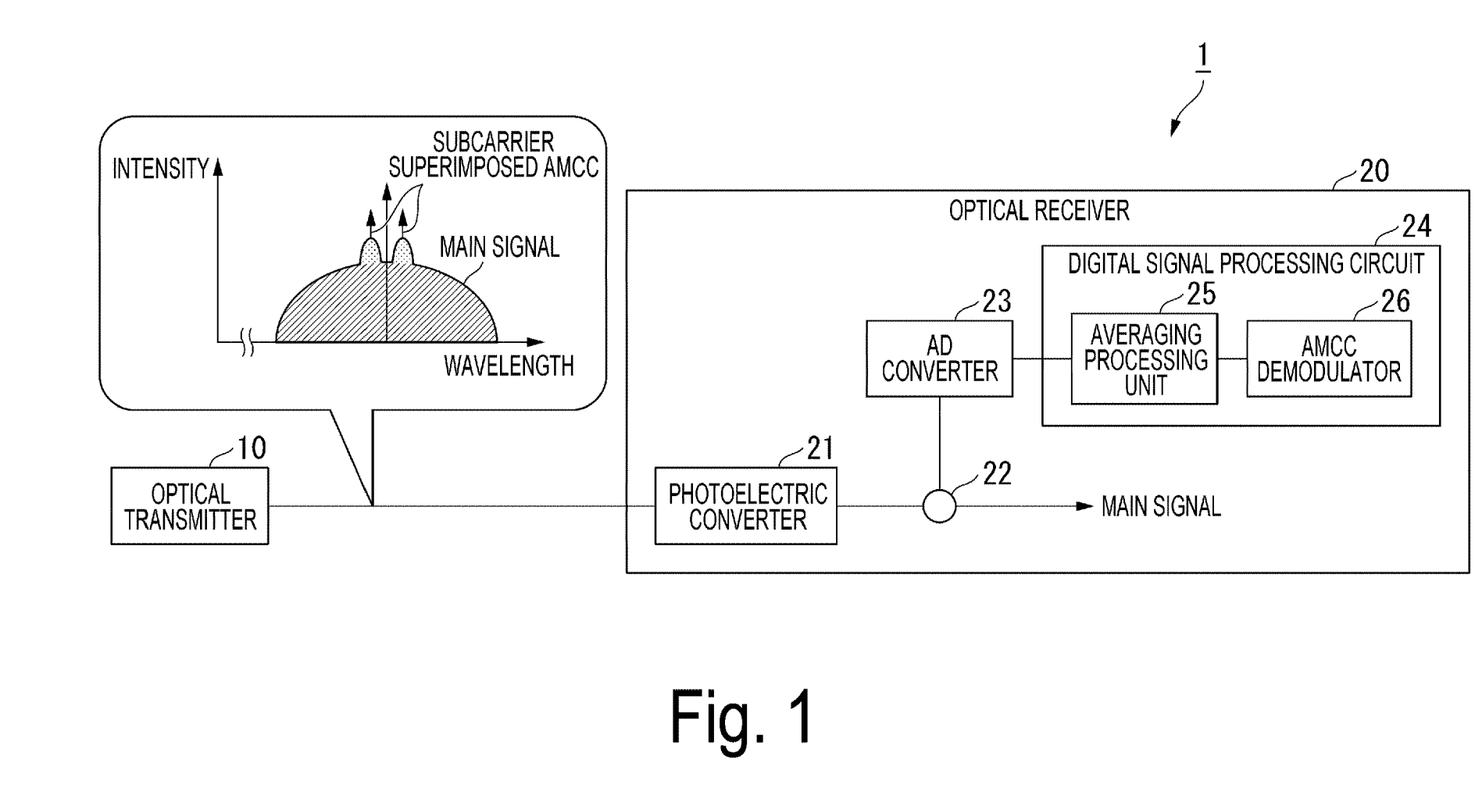
FIG. 1 is a diagram illustrating an example configuration of an optical access system according to a first embodiment.

FIG. 1 is a diagram illustrating an example configuration of an optical access system 1 according to a first embodiment. The optical access system 1 according to the present invention includes an optical transmitter 10 and an optical receiver 20. Where the optical access system 1 is a PON, the optical transmitter 10 is included in an OLT, and the optical receiver 20 is included in an ONU. The optical transmitter 10 and the optical receiver 20 are communicably connected via an optical fiber. The optical access system 1 according to the present invention can be applied to any system in which at least part of a transmission path is shared by WDM.

The optical transmitter 10 transmits an optical signal obtained by superimposing monitoring control signals on a main signal, to the optical receiver 20. Specifically, the optical transmitter 10 repeatedly generates a monitoring control signal including identical information for each frame during each cycle T. Hereinafter, the monitoring control signals generated for each frame will be referred to as a monitoring control frame. The optical transmitter 10 transmits an optical signal obtained by superimposing the generated monitoring control frame on a main signal, to the optical receiver 20. In this manner, the optical transmitter 10 superimposes a low-speed monitoring control signal (AMCC) on a high-speed main signal in different channels at the same wavelength, and then transmits the resultant signal. The identical information included in the monitoring control signals includes information regarding unused wavelengths, for example (the information will be hereinafter referred to as the "unused wavelength information").

The optical transmitter 10 superimposes the monitoring control signals on the subcarrier, and uses the superimposed signals. With the monitoring control signals superimposed on the subcarrier, it is possible to enhance reception sensitivity, using a phase modulation (PM) signal or a frequency modulation (FM) signal, instead of an amplitude modulation (AM) signal (an on/off signal).

In a case where the optical transmitter 10 is included in an OLT, the OLT has the same configuration as that of each optical transmission unit 110 illustrated in FIG. 9, and further, the optical transmitter 10 transmits a monitoring control frame during in a cycle T.

FIG. 1 illustrates a situation in which the optical transmitter 10 superimposes subcarrier-modulated monitoring control signals on an on-off modulated main signal.

The optical receiver 20 includes a photoelectric converter 21, a branching unit 22, an AD converter (analog-to-digital converter) 23, and a digital signal processing circuit 24.

The photoelectric converter 21 converts an optical signal input to the optical receiver 20, into an electrical signal.

The branching unit 22 branches the electrical signal converted by the photoelectric converter 21. The electrical signal branched into a first path by the branching unit 22 is used for receiving a main signal. The electrical signal branched into a second path by the branching unit 22 is input to the AD converter 23.

The AD converter 23 performs sampling for the period of time in which at least the monitoring control frame is included in a plurality of frames. Here, sampling means that an electrical signal is quantized to generate quantized data.

The digital signal processing circuit 24 includes an averaging processing unit (averaging processor) 25 and an AMCC demodulator (demodulator) 26.

The averaging processing unit 25 performs an averaging process with a plurality of monitoring control frames, using the quantized data generated by the AD converter 23.

The AMCC demodulator 26 demodulates the monitoring control signals, using the averaged quantized data of the monitoring control frames.

Figure 2:
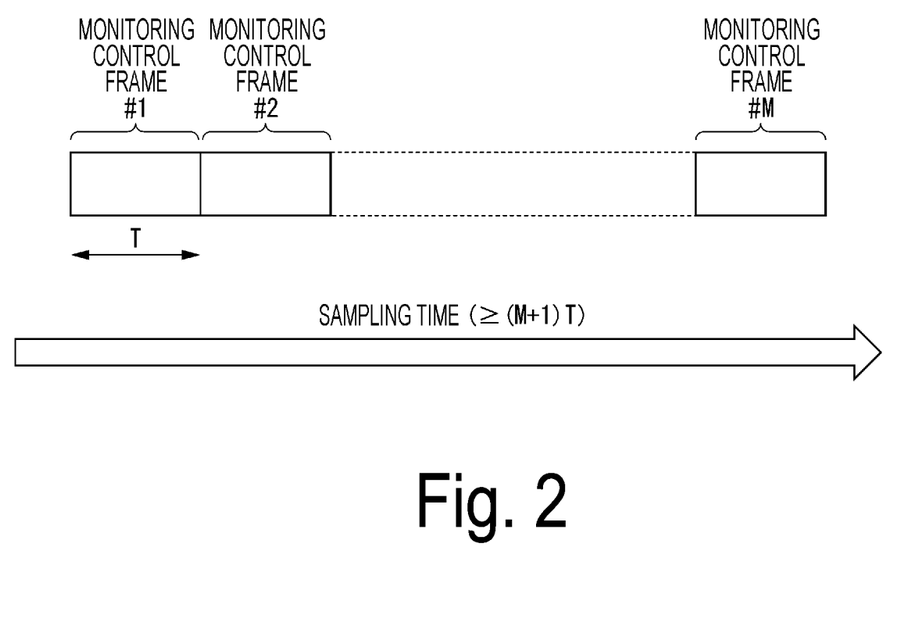
FIG. 2 is a diagram for explaining a sampling method to be implemented by an AD converter 23.
Figure 3:
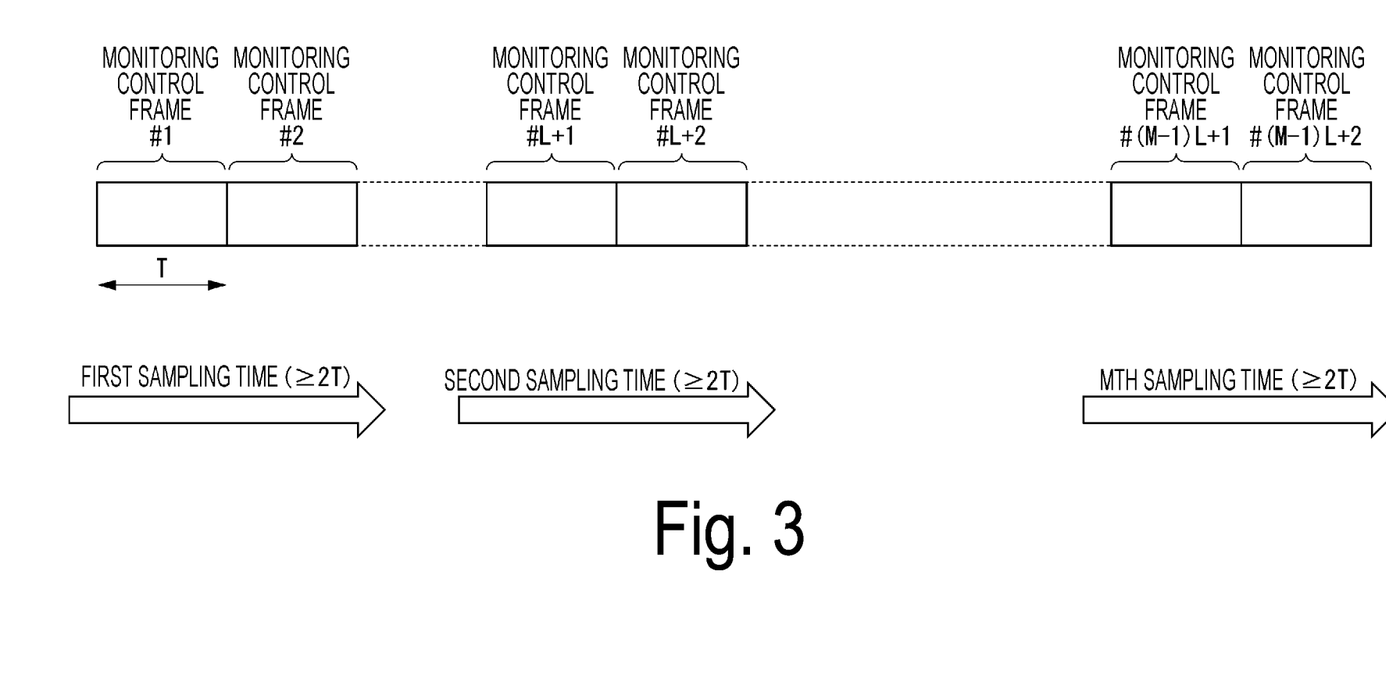
FIG. 3 is a diagram for explaining a sampling method to be implemented by the AD converter 23.

Next, sampling methods to be implemented by the AD converter 23 are described with reference to FIGS. 2 and 3. FIGS. 2 and 3 are diagrams for explaining sampling methods to be implemented by the AD converter 23. In the description below, the sampling method illustrated in FIG. 2 will be referred to as the first sampling method, and the sampling method illustrated in FIG. 3 will be referred to as the second sampling method.

First, the first sampling method is described. As illustrated in FIG. 2, in a case where the number of frames to be used in an averaging process is M, the AD converter 23 acquires M monitoring control frames in one sampling process according to the first sampling method. Where the sampling time for one monitoring control frame is represented by T, the sampling time is made equal to or longer than $(M+1)T$ so that M monitoring control frames can be acquired within the sampling time without fail.

Next, the second sampling method is described. As illustrated in FIG. 3, in a case where the number of frames to be used in an averaging process is M, the AD converter 23 acquires monitoring control frames in M sampling processes according to the second sampling method. In each sampling process, the sampling time is made equal to or longer than $2T$ so that a plurality of frames (a case where L frames (L being an integer of 1 or greater) are included is illustrated in FIG. 3).

The second sampling method uses optical signals of longer times than those of the first sampling method. Accordingly, the correlation of noise added between monitoring control frames becomes smaller, and the effect to improve the signal-noise ratio (SNR) by averaging becomes greater.

The AD converter 23 may perform sampling each time, or may perform constantly and read sampling data from a memory (not shown) to use the sampling data when necessary.

Figure 4:
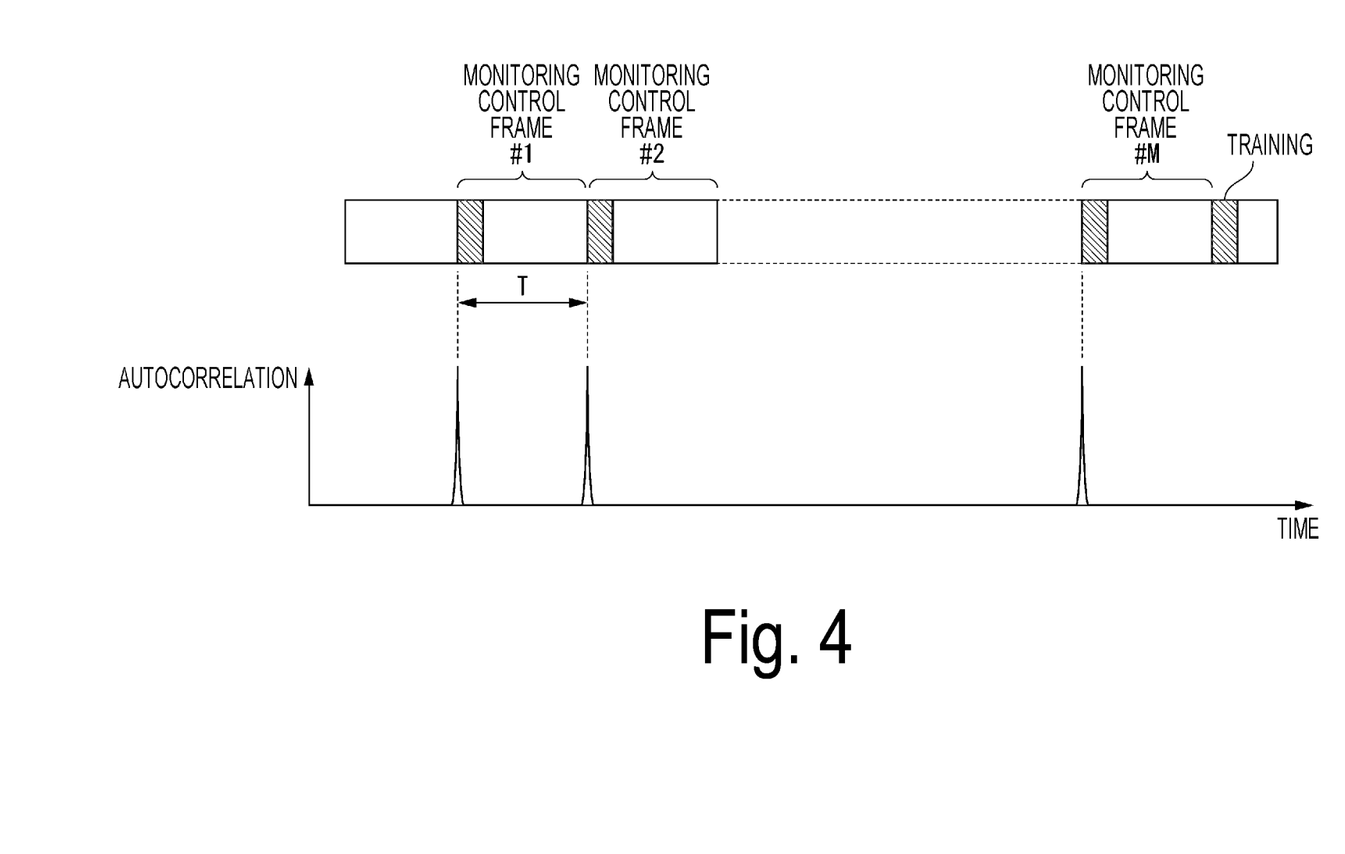
FIG. 4 is a diagram for explaining a method for grasping the head samples of monitoring control frames.

The averaging processing unit 25 needs to grasp the head portions of the monitoring control frames in quantized data. Therefore, a method for grasping the head samples of monitoring control frames is now described with reference to FIG. 4. Here, an example case where autocorrelation is calculated with an autocorrelation function is described. FIG. 4 is a diagram for explaining a method for grasping the head samples of monitoring control frames.

FIG. 4 illustrates a method for grasping the sample positions corresponding to the peaks of the cross-correlation as the heads of the monitoring control frames, by adding preambles as known training signals having high correlation to the heads of the monitoring control frames when the optical transmitter 10 generates the monitoring control frames. In this manner, the sample positions of the heads of the monitoring control frames can be grasped. The averaging processing unit 25 calculates the cross-correlation with the preamble portions stored beforehand in the optical receiver 20 on the basis of the input quantized data, and grasps the sample positions corresponding to the peaks of the cross-correlation as the heads of the monitoring control frames. The averaging processing unit 25 then performs the averaging process among the plurality of monitoring control frames sequentially, starting from the head sample point.

As described above, the AMCC demodulator 26 demodulates the monitoring control signals, using the quantized data subjected to the averaging process in the averaging processing unit 25. When averaging is performed M times, the SNR can be made M times higher.

Figure 5:
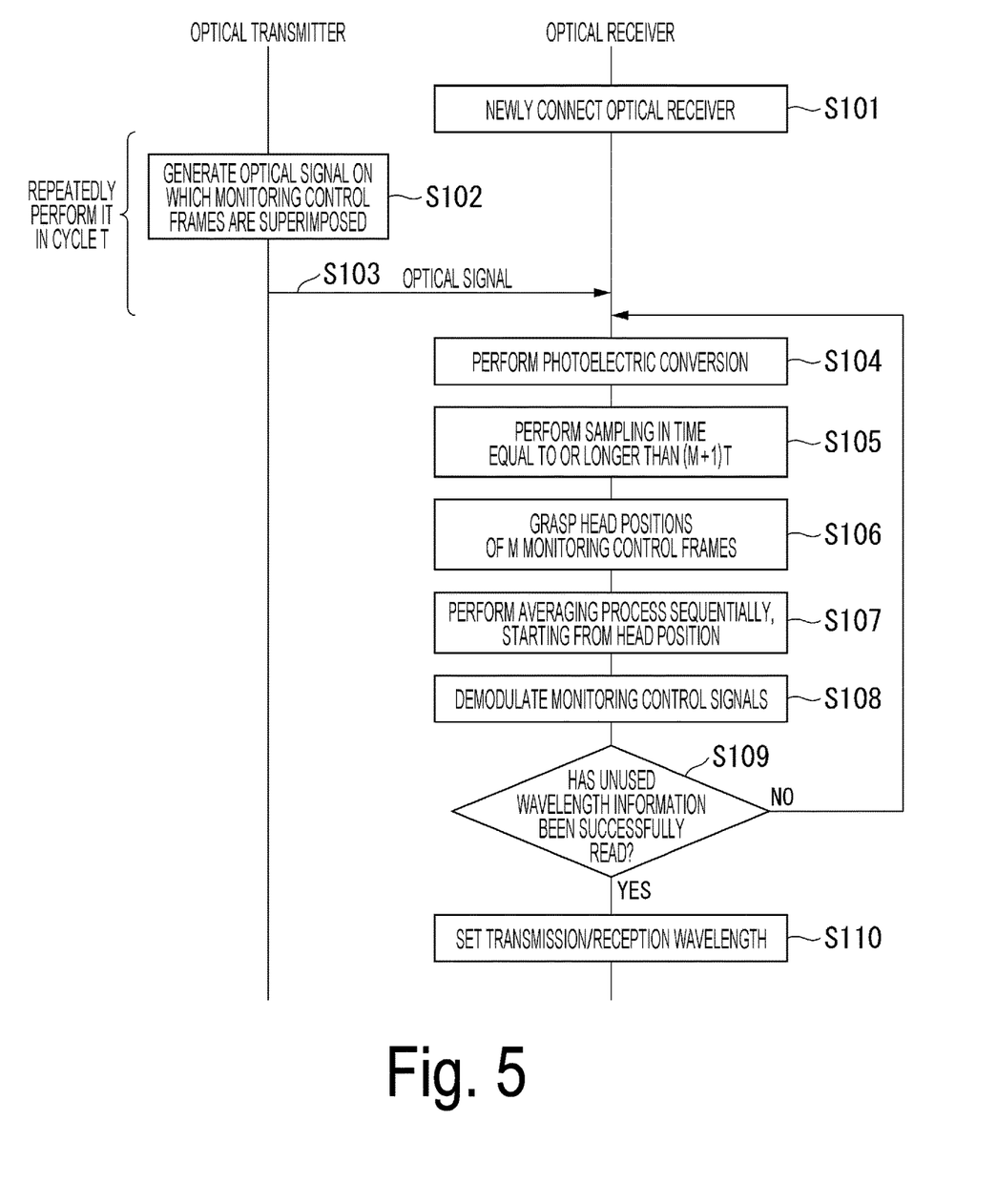
FIG. 5 is a sequence diagram illustrating a flow in a process to be performed by the optical access system according to the first embodiment.

FIG. 5 is a sequence diagram illustrating the flow in a process to be performed by the optical access system 1 according to the first embodiment. Note that, referring to FIG. 5, a case where the first sampling method is used is described.

The optical receiver 20 as an ONU is connected to the optical access system 1 (step S101). The optical transmitter 10 generates an optical signal on which monitoring control frames are superimposed (step S102). The optical transmitter 10 transmits the generated optical signal to the optical transmission line (step S103). The optical signal generated by the optical transmitter 10 includes unused wavelength information in addition to the main signal. In a case where a plurality of optical receivers 20 is connected to the optical access system 1, the optical signal transmitted from the optical transmitter 10 is transmitted to the plurality of optical receivers 20.

The optical transmitter 10 repeatedly performs the processes in steps S102 and 103 in cycles T. Note that, in a case where the optical transmitter 10 generates an optical signal on which a predetermined number of monitoring control frames are superimposed, there is no need to generate an optical signal on which monitoring control frames are superimposed, until the optical receiver 20 is connected next time. The optical transmitter 10 may generate a next optical signal at the time when a cycle T has elapsed from the time point at which the optical signal was transmitted, or may generate a next optical signal at the time when a cycle T has elapsed from the time point at which the optical signal was generated.

The photoelectric converter 21 of the optical receiver 20 converts the input optical signal into an electrical signal (step S104). The electrical signal converted by the photoelectric converter 21 is branched into the first path and the second path by the branching unit 22. When electrical signals are input to the AD converter 23 through the second path, the AD converter 23 samples the input electrical signals in a time equal to or longer than (M+1)T (step S105). Here, the number of frames to be used in an averaging process is M. The AD converter 23 samples M electrical signals in a time equal to or longer than (M+1)T, to generate quantized data of M monitoring control frames. The AD converter 23 outputs the generated quantized data of M monitoring control frames to the averaging processing unit 25.

The averaging processing unit 25 calculates the cross-correlation between the quantized data of M monitoring control frames and the known preambles, to grasp the head positions of the respective monitoring control frames (step S106). The averaging processing unit 25 performs the averaging process sequentially, starting from the grasped head position (step S107). The averaging processing unit 25 outputs the data subjected to the averaging process to the AMCC demodulator 26. The AMCC demodulator 26 demodulates the monitoring control signals, using the averaged data output from the averaging processing unit 25 (step S108).

The AMCC demodulator 26 determines whether the unused wavelength information included in the monitoring control signals has been successfully read (step S109). If the unused wavelength information included in the monitoring control signals has been acquired, the AMCC demodulator 26 determines that the unused wavelength information has been successfully read. If the unused wavelength information included in the monitoring control signals has not been acquired, on the other hand, the AMCC demodulator 26 determines that the unused wavelength information has not been successfully read.

If the unused wavelength information has not been successfully read (NO in step S109), the optical receiver 20 repeatedly performs the processes in and after step S104.

If the unused wavelength information has been successfully read (YES in step S109), the AMCC demodulator 26 sets the transmission/reception wavelength on the basis of the acquired unused wavelength information (step S110).

Figure 6:
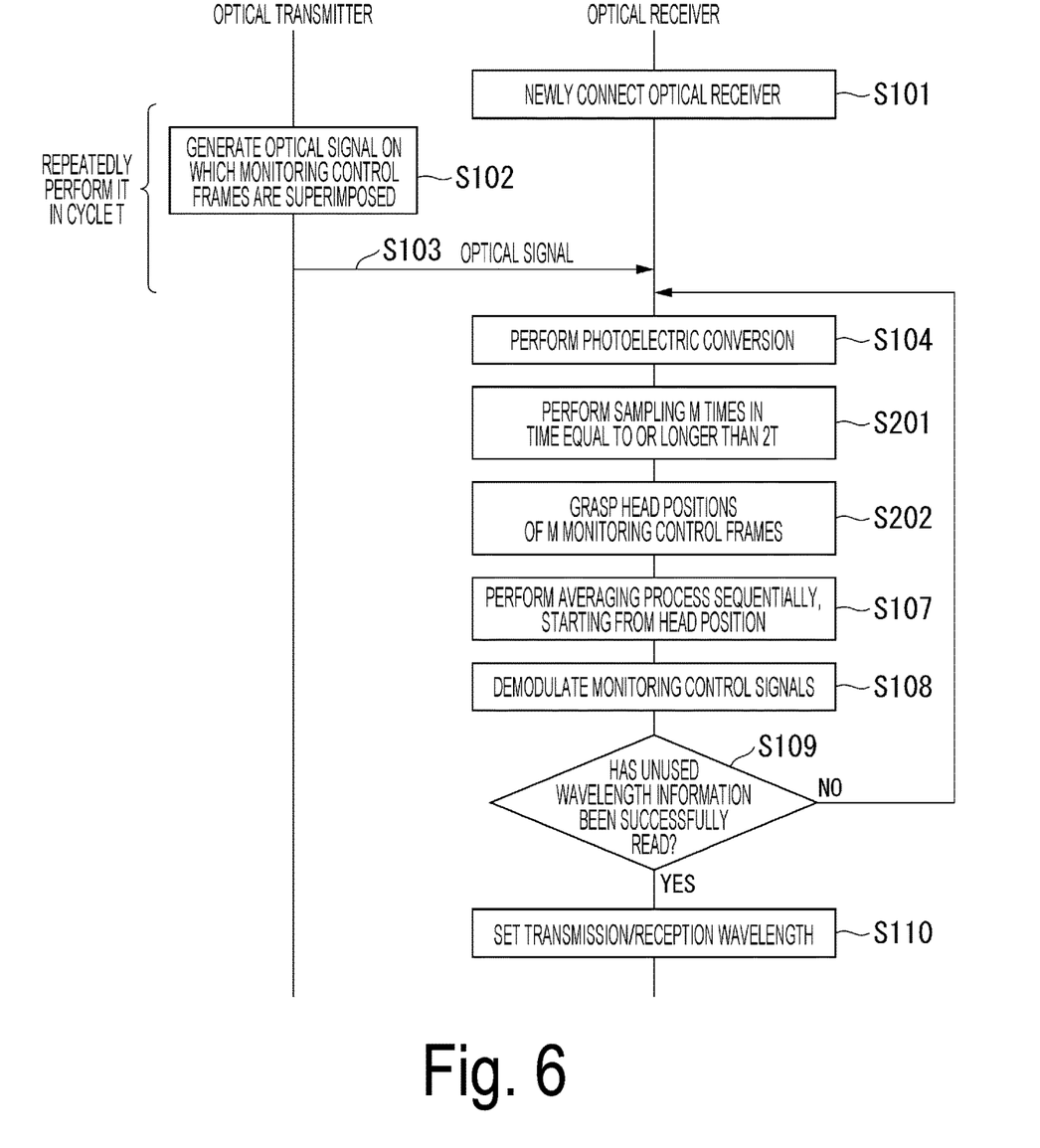
FIG. 6 is a sequence diagram illustrating a flow in a process to be performed by the optical access system according to the first embodiment.

FIG. 6 is a sequence diagram illustrating the flow in a process to be performed by the optical access system 1 according to the first embodiment. Note that, referring to FIG. 6, a case where the second sampling method is used is described. In FIG. 6, the same processes as those in FIG. 5 are denoted by the same reference numerals as those used in FIG. 5, and explanation thereof is not repeated herein.

When electrical signals are input to the AD converter 23 through the second path, the AD converter 23 samples input electrical signals M times in a time equal to or longer than 2T (step S201). Specifically, the AD converter 23 first generates quantized data by sampling two electrical signals input during a cycle T, in a time equal to or longer than 2T. The AD converter 23 outputs the generated quantized data to the digital signal processing circuit 24.

Next, the AD converter 23 generates quantized data by sampling two electrical signals that are an electrical signal newly input during a cycle T and an electrical signal used in the previous process, in a time equal to or longer than 2T. The AD converter 23 outputs the generated quantized data to the digital signal processing circuit 24.

The AD converter 23 repeats the above process M times, to generate M pieces of quantized data.

The M pieces of quantized data are output from the AD converter 23 to the averaging processing unit 25. The averaging processing unit 25 calculates the cross-correlation between the quantized data of M monitoring control frames and the known preambles, to grasp the head positions of the respective monitoring control frames (step S202). After that, the processes in and after step S107 are performed.

When another optical receiver 20 is newly connected to the optical access system 1, the unused wavelength information is updated. Therefore, monitoring control signals may be changed during sampling. In this case, the unused wavelength information after a change cannot be read, and therefore, the result of the process in step S109 is "NO". In this case, the optical receiver 20 again performs sampling. Note that, in a case where the optical receiver 20 constantly performs sampling, the sampling data at that time is read and processed.

With the optical access system 1 designed as described above, it is possible to enhance the reception sensitivity to monitoring control signals, while reducing the influence on the main signal. Specifically, the optical transmitter 10 repeatedly generates monitoring control signals including identical information frame by frame, and transmits an optical signal in which the generated monitoring control frames are superimposed on the main signal, to the transmission path. The optical receiver 20 converts received optical signals into electrical signals, and then samples and quantizes the electrical signals at a constant frequency through analog-to-digital conversion at least for a time involving the monitoring control frames. After that, the optical receiver 20 performs an averaging process on a plurality of monitoring control frames sequentially, starting from each head sample point of the plurality of monitoring control frames, and thus, demodulates the monitoring control signals, using the quantized data subjected to the averaging process. This makes it possible to enhance the reception sensitivity at the time of reception of the monitoring control signals including the identical information. Further, it is possible to enhance the reception sensitivity to the main signal, by lowering the superimposition ratio of the monitoring control signals, and reducing the branch loss at the optical reception stage.

Second Embodiment

Figure 7:
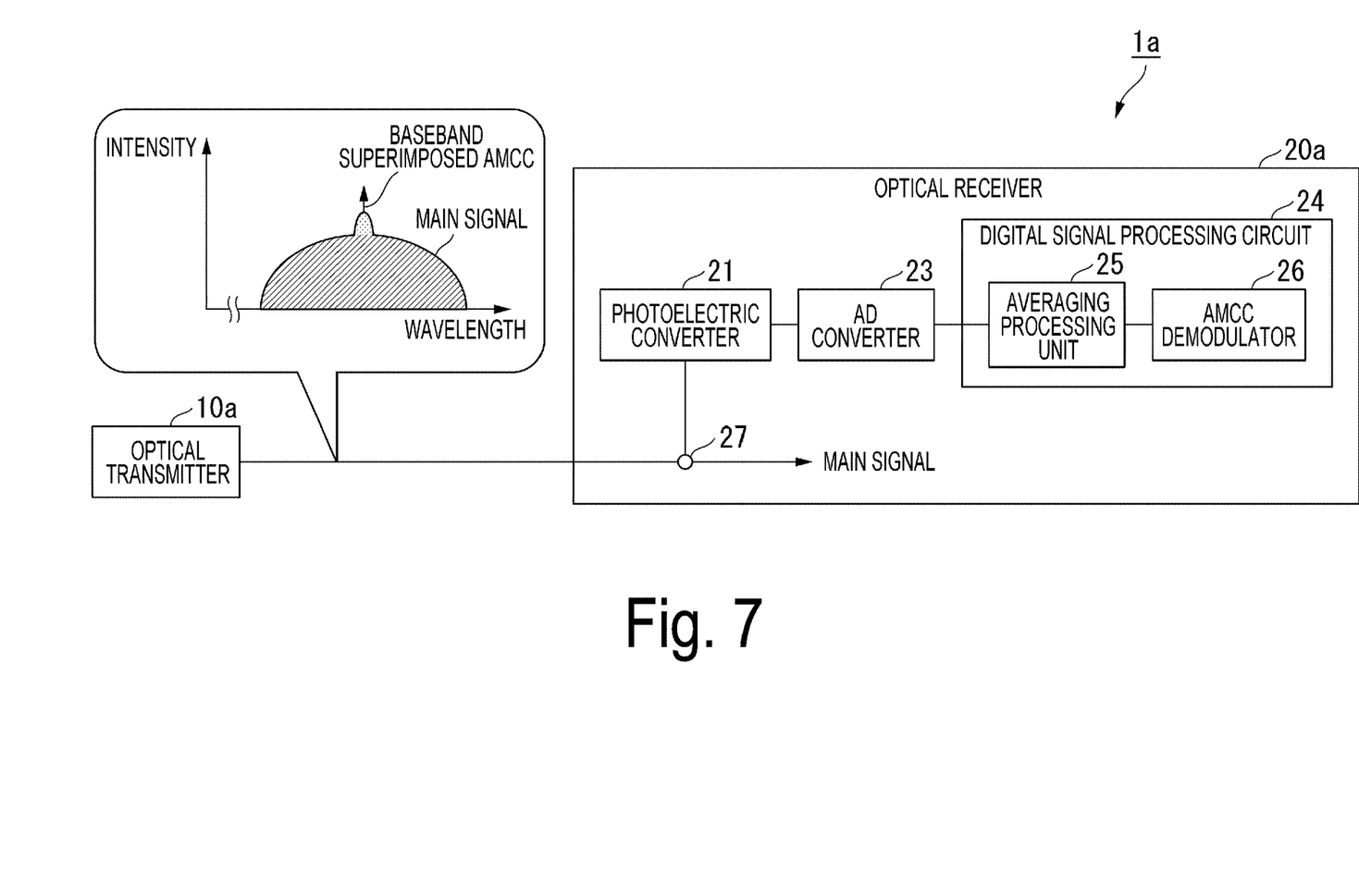
FIG. 7 is a diagram illustrating an example configuration of an optical access system according to a second embodiment.

FIG. 7 is a diagram illustrating an example configuration of an optical access system 1a according to a second embodiment. The optical access system 1a according to the present invention includes an optical transmitter 10a and an optical receiver 20. Where the optical access system 1a is a PON, the optical transmitter 10a is included in an OLT, and the optical receiver 20 is included in an ONU. The optical transmitter 10a and the optical receiver 20 are communicably connected via an optical fiber.

The optical access system 1a differs from the optical access system 1 according to the first embodiment in that baseband monitoring control signals are superimposed on a phase-modulated main signal, and that an optical receiver 20a includes an optical branching unit 27 in place of the branching unit 22. That is, while subcarrier-modulated monitoring control signals are superimposed on an on-off modulated main signal in the optical access system 1, baseband monitoring control signals are superimposed on a phase-modulated main signal, and the optical receiver 20a includes the optical branching unit 27 in place of the branching unit 22, in the optical access system 1a. The other components are the same as those of the first embodiment. In the description below, the different aspects are described.

The optical transmitter 10a transmits an optical signal obtained by superimposing monitoring control signals on a main signal, to the optical receiver 20a.

Specifically, the optical transmitter 10a repeatedly generates a monitoring control signal including identical information for each frame during each cycle T. The optical transmitter 10a transmits the generated optical signal obtained by superimposing monitoring control signals on the main signal, to the optical receiver 20a. At this point of time, the optical transmitter 10a uses the monitoring control signals as baseband signals.

The optical branching unit 27 branches the optical signal input to the optical receiver 20. The optical signal branched into a first path by the optical branching unit 27 is used for receiving the main signal. The optical signal branched into a second path by the optical branching unit 27 is input to the photoelectric converter 21.

With the optical access system 1a according to the second embodiment designed as above, the same effects as those of the first embodiment can be achieved.

Some of the functions of the optical transmitters 10 and 10a, and the optical receivers 20 and 20a in the above embodiments may be formed with a computer. In that case, the program for achieving these functions may be recorded in a computer-readable recording medium, and the program recorded in the recording medium may be read and executed by a computer system to achieve the functions. Note that the "computer system" mentioned herein includes hardware such as an OS and peripheral devices. Also, the "computer-readable recording medium" refers to a portable medium such as a flexible disk, a magneto-optical disk, a ROM, or a CD-ROM, or a storage device such as a hard disk included in a computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside a computer system serving as a server or a client in that case. Also, the above program may be for achieving some of the functions described above, may be formed with a combination of the functions described above and a program already recorded in a computer system, or may be formed with a programmable logic device such as an FPGA.

Although embodiments of the present invention have been described in detail with reference to the drawings so far, specific configurations are not limited to these embodiments, and include designs and the like without departing from the spirit of the present invention.

INDUSTRIAL APPLICABILITY

The present invention can be applied to an optical access system that uses WDM.

REFERENCE SIGNS LIST 10, 10a optical transmitter
20, 20a optical receiver
21 photoelectric converter
22 branching unit
23 AD converter
24 digital signal processing circuit
25 averaging processing unit
26 AMCC demodulator
27 optical branching unit

The invention claimed is:

1. An optical access system comprising an optical transmission device and an optical reception device, wherein
the optical transmission device includes:
a signal generator configured to generate a plurality of optical signals by generating monitoring control signals including identical information in predetermined cycles and superimposing the monitoring control signals on a main signal each time generating the monitoring control signals; and
a transmitter configured to transmit the generated optical signals to the optical reception device, and
the optical reception device includes:
a photoelectric converter configured to convert the optical signals into electrical signals;
an analog-to-digital converter configured to generate quantized data of a plurality of the monitoring control signals by sampling a plurality of the electrical signals including the plurality of the monitoring control signals;
an averaging processor configured to perform an averaging process between a plurality of the generated quantized data; and
a demodulator configured to demodulate the monitoring control signals, using the plurality of pieces of the quantized data subjected to the averaging process.

2. The optical access system according to claim 1, wherein
the analog-to-digital converter generates the quantized data of the plurality of the monitoring control signals, by sampling electrical signals in one process, the electrical signals corresponding to the number of the electrical signals to be used in the averaging process to be performed by the averaging processor.

3. The optical access system according to claim 1, wherein
the analog-to-digital converter generates the quantized data of the plurality of the monitoring control signals, by performing sampling corresponding to the number of used electrical signals in the averaging process corresponding to the number of the electrical signals to be used in the averaging process to be performed by the averaging processor, using at least a plurality of the electrical signals in one process, the sampling being performed a number of times equal to the number of the electrical signals to be used in the averaging process.

4. The optical access system according to claim 1, wherein
the signal generator adds a known training signal having a strong correlation as a preamble to a head position of the monitoring control signal, when generating the monitoring control signal, and
the averaging processor performs the averaging process by detecting the head position of each monitoring control signal through calculation of a cross-correlation with the known preambles in the quantized data of the plurality of the monitoring control signals.

5. A demodulation method implemented by an optical reception device in an optical access system that includes an optical transmission device and the optical reception device, the demodulation method comprising:
converting an optical signal into an electrical signal, the optical signal being transmitted from the optical transmission device in a predetermined cycle, the optical signal being generated by superimposing monitoring control signals including identical information on a main signal;
generating quantized data of a plurality of the monitoring control signals by sampling a plurality of the electrical signals including the plurality of the monitoring control signals;
performing an averaging process between a plurality of the generated quantized data; and
demodulating the monitoring control signals, using the plurality of pieces of the quantized data subjected to the averaging process.

* * * * *